9081X
W. A. Needham,
Sawr-Mill Head-Block.
Patented Sep. 9, 1835.
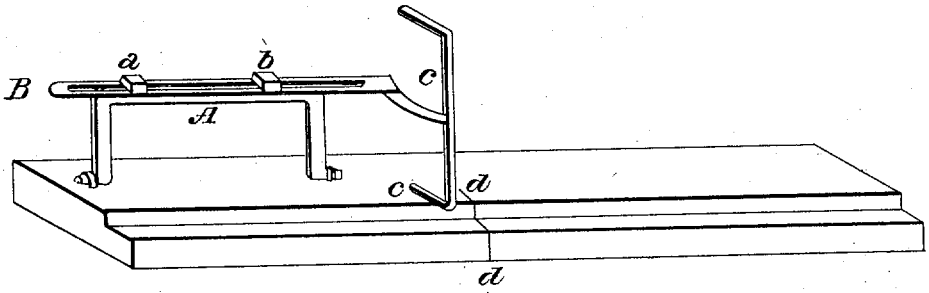
AM. PHOTO-LITHO. CO. N.Y. (OSBORNE'S PROCESS.)

9081X

William A. Needham, of Brimfield, Massachusetts.

Letters Patent.

The schedule referred to in these Letters Patent and making part of the same containing a description in the words of the said William A. Needham himself of his improvement in a machine for measuring the thickness into which a log may be sawed, To all to whom these presents shall come, Be it known that I William A. Needham of Brimfield in the county of Hampden and commonwealth of Massachusetts, have invented a new and useful Machine called a guage for measuring the size or thickness of boards planks & other stuff to be sawed at a saw mill, and that the following is a full and exact description thereof.

The main body of the machine consists of a hinge part (marked (A, in the accompanying figure) formed by two upright bars, connected at the top by a cross bar, usually made of one piece attached to the head block by bolts so as to revolve backwards & forwards, in the eyes of the bolts; upon the hinge part rests a slide (marked B.) graduated on the outer edge for inches and eighths of inches made of open work or with a slant so as to move back and forth and regulated or kept in place by two wrench screws (marked a & b) to the inner end of the slide being the end nearest the saw, is attached a regulator (marked C) in the shape of a T, so that the end (marked C) may rest upon the head block, the use of the regulator, is to keep the log plum and in such a position as to be sawed of the thickness indicated by the graduated slide. The relative position of the machine to the saw will be understood by the description particularly of the use of the regulator, which is to be placed against the log at such a distance from the saw as shall be equal to the thickness of the stuff to be sawed, whether board or plank. The machine should be made of iron or steel, or of materials equally firm & durable, What I claim as my invention is such an arrangement

90981X of the parts described as will according to the description cause a log to be sawed into any required thickness, marked upon the graduated edge of the dial —

Witness,
Wm B. Calhoun
Jno H. Polkhurst

Wm A. Needham

465 ...

(Drawing)